(12) United States Patent
Machliner et al.

(10) Patent No.: US 11,092,238 B2
(45) Date of Patent: Aug. 17, 2021

(54) MULTIPLE-PIECE OIL STRIPPING PISTON RING WITH REDUCED FRICTION

(71) Applicant: FEDERAL-MOGUL BURSCHEID GMBH, Burscheid (DE)

(72) Inventors: Stephan Machliner, Leverkusen (DE); Fabian Ruch, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 37 days.

(21) Appl. No.: 16/082,607

(22) PCT Filed: Nov. 28, 2016

(86) PCT No.: PCT/EP2016/078954
§ 371 (c)(1),
(2) Date: Sep. 6, 2018

(87) PCT Pub. No.: WO2017/157490
PCT Pub. Date: Sep. 21, 2017

(65) Prior Publication Data
US 2019/0113139 A1 Apr. 18, 2019

(30) Foreign Application Priority Data
Mar. 16, 2016 (DE) ...................... 10 2016 104 853.4

(51) Int. Cl.
*F16J 9/06* (2006.01)
*F16J 9/20* (2006.01)
*F16J 9/22* (2006.01)

(52) U.S. Cl.
CPC ................. *F16J 9/068* (2013.01); *F16J 9/20* (2013.01); *F16J 9/203* (2013.01); *F16J 9/066* (2013.01); *F16J 9/22* (2013.01)

(58) Field of Classification Search
CPC .... F16J 9/064; F16J 9/066; F16J 9/067; F16J 9/068; F16J 9/203; F16J 9/06; F16J 9/22
See application file for complete search history.

(56) References Cited

U.S. PATENT DOCUMENTS 2,554,069 A * 5/1951 Stanley .................... F16J 9/203
277/456
2,656,230 A 10/1953 Phillips
(Continued)

FOREIGN PATENT DOCUMENTS

DE 2709176 * 9/1978
DE 33 18 208 C1 10/1984
(Continued)

*Primary Examiner* — Nicholas L Foster
(74) *Attorney, Agent, or Firm* — Robert L. Stearns; Dickinson Wright, PLLC

(57) ABSTRACT

A three-piece piston oil control ring 2 has an upper, disc-shaped scraping ring 4, a lower, disc-shaped stabilising ring 6, and a circular expander 8 which has projections 10 protruding in the axial direction on an inner face. The circular expander 8 is arranged between the upper scraping ring 4 and the lower stabilising ring 6, wherein the projections 10 each bear inwardly against an inner face 14 of the scraping ring 4 or against an inner face 16 of the stabilising ring 6. An outer radius 18 of the scraping ring 4 is greater than an outer radius 20 of the lower stabilising ring 6, so that there is a radius difference δ between the scraping ring 4 and the stabilising ring 6.

13 Claims, 4 Drawing Sheets

(56) References Cited

U.S. PATENT DOCUMENTS

| | | | | |
|---|---|---|---|---|
| 3,370,858 A * | 2/1968 | Braendel | ............... | F16J 9/063 |
| | | | | 277/477 |
| 5,039,116 A * | 8/1991 | Maeda | ............... | F16J 9/064 |
| | | | | 277/444 |
| 5,251,915 A * | 10/1993 | Meernik | ............... | F16J 9/062 |
| | | | | 277/457 |
| 5,564,699 A * | 10/1996 | Lawrence | ............... | F16J 9/062 |
| | | | | 277/497 |
| 5,603,512 A * | 2/1997 | Lawrence | ............... | F16J 9/062 |
| | | | | 277/446 |
| 7,854,191 B2 * | 12/2010 | Kariya | ............... | F16J 9/067 |
| | | | | 92/253 |
| 10,253,882 B2 * | 4/2019 | Sytsma | ............... | F16J 9/066 |
| 2009/0013866 A1 * | 1/2009 | Kariya | ............... | F16J 9/067 |
| | | | | 92/172 |
| 2015/0184748 A1 * | 7/2015 | Sytsma | ............... | F16J 9/06 |
| | | | | 277/310 |

FOREIGN PATENT DOCUMENTS

| | | | | |
|---|---|---|---|---|
| DE | 102015118828 A1 * | 5/2017 | | |
| DE | 102018117198 A1 * | 1/2020 | ............... | F16J 9/066 |

* cited by examiner

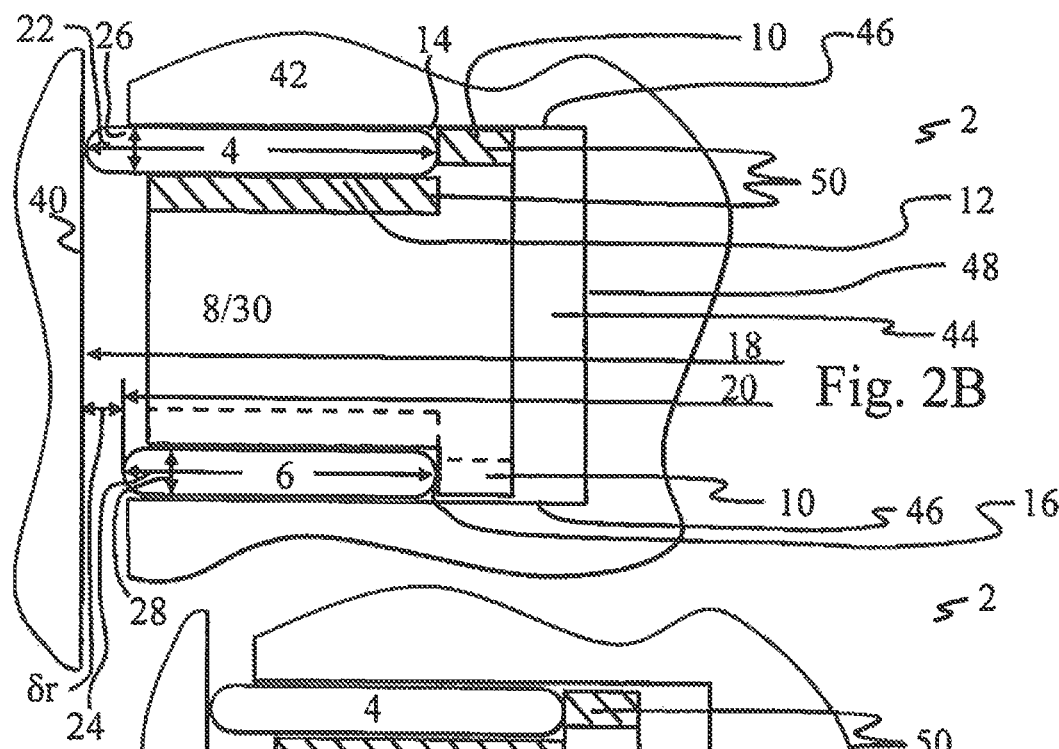
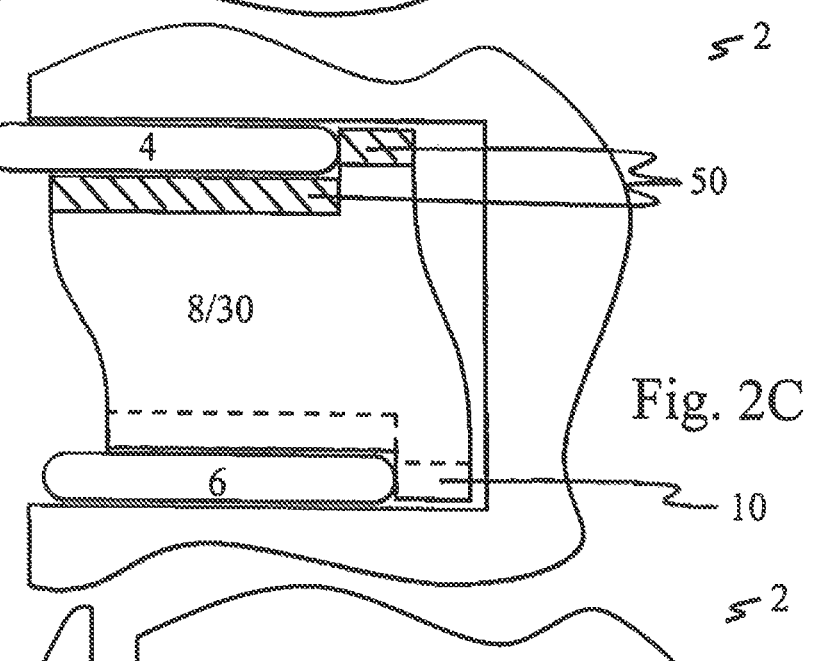
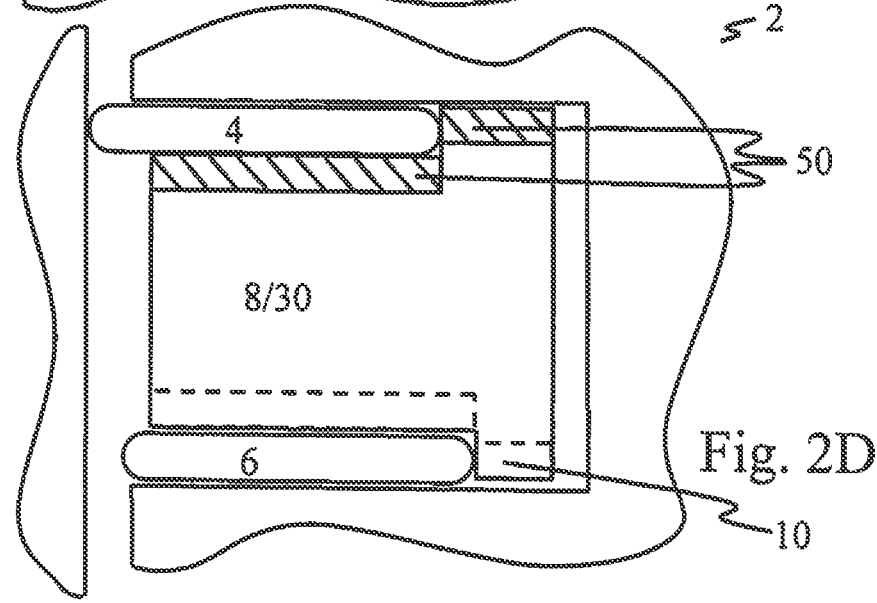

MULTIPLE-PIECE OIL STRIPPING PISTON RING WITH REDUCED FRICTION

BACKGROUND

1. Technical Field

The present invention relates to a three-piece piston oil control ring with reduced friction in comparison with conventional piston rings.

2. Related Art

Conventional piston oil control rings or scraper rings or oil rings usually comprise one ring which has two oil-scraping rails, which are intended to remove excess oil from the cylinder inner surface of an internal combustion engine and to produce a defined oil film which is as thin as possible.

There are different types of scraper rings: Simple scraper rings usually comprise only one ring body with two scraping rails arranged on the outer surface. Further developed configurations relate to scraper rings with an additional expander spring which is intended to achieve a more uniform scraping effect over the whole circumference of the scraper ring.

In a further embodiment, what are known as three-piece scraper rings are known, in which two thin, disc-shaped scraping rings are held in a piston ring groove by a common carrier, which often also assumes the function of an expander spring.

A three-piece scraper ring is known from American U.S. Pat. No. 2,656,230 from 1953.

SUMMARY

It is desirable to reduce the friction in particular of internal combustion engines. The object of the present invention is to reduce the friction losses of an internal combustion engine by reducing the friction produced by a scraper ring.

The present invention relates to a piston ring according to one of the independent claims, advantageous embodiments being defined in the dependent claims.

A first aspect of the present invention specifies a three-piece piston oil control ring having an upper, i.e. facing the combustion chamber or piston head, disc-shaped scraping ring, a lower, i.e. facing the crankcase or piston skirt or piston pin, disc-shaped stabilising ring, and an expander, which can be in the form of for example a circular, corrugated, flat metal strip and has axially protruding projections on the inside.

The expander or expander spring has axially protruding projections on an inner face and is arranged between the scraping ring and the stabilising ring. The expander ensures an axial spacing between the scraping ring and the stabilising ring.

The projections of the circular expander bear at least against the inside of the scraping ring and of the stabilising ring and push them outwards. The scraping ring has a larger outer radius and therefore outer diameter than the stabilising ring.

In a basic embodiment, the stabilising ring therefore exerts a lower pressure on a cylinder inner surface, so that the friction thereof is negligible in comparison with the friction of the scraper ring.

In a further embodiment of the present invention, the difference between the outer diameter/radius of the scraping ring and that of the stabilising ring is so large that only a scraping edge of the upper scraping ring is in contact with a cylinder inner surface when the piston oil control ring is installed, and the lower, disc-shaped stabilising ring is not in contact with the cylinder inner surface when the piston oil control ring is installed. It can thereby be ensured that the component of the friction which is produced by the lower ring or stabilising ring is completely negligible.

In a further embodiment of the piston oil control ring, the upper scraping ring has the same thickness in the radial direction as the lower, disc-shaped stabilising ring. It can thereby be ensured that as long as the scraping ring and the stabilising ring are produced from the same material, substantially the same radial forces are produced. Identical forces can substantially ensure that the circular expander spring is not tilted or cannot be tilted in the piston ring groove. This embodiment also requires an asymmetrically shaped expander, otherwise the different outer diameters/radii of the scraping ring and of the stabilising ring cannot be implemented.

In a further embodiment of the piston oil control ring, the upper scraping ring has a smaller thickness in the radial direction than the lower, disc-shaped stabilising ring. The stabilising ring can thus exert a greater radial force in the direction of the bottom of the piston ring groove than the scraping ring. This force difference can be used to equalise the difference in radial forces resulting from the bearing force of the scraping ring on the cylinder inner wall. Ideally, the scraping ring bears against the inside of the cylinder with a defined force and the stabilising ring supports the lower face of the expander or of the circular, corrugated, flat metal strip with the same force, so that the latter cannot tilt or jam in the piston ring groove.

The effects of the thickness in the radial direction can also be transferred to the axial direction.

In a further advantageous embodiment of the three-piece piston oil control ring, the upper scraping ring and the lower, disc-shaped stabilising ring have an identical thickness in the axial direction. In this case, the lower stabilising ring can produce the forces by greater deformation. An identical thickness in the axial direction also allows a symmetrical expander to be used; in particular the projections can be identical.

In a further embodiment, the upper scraping ring is thinner in the axial direction than the lower stabilising ring. The stabilising ring can then be made more rigid and can build up sufficient pressure relative to the expander, preventing it from being pressed against the cylinder inner surface by the expander.

In one embodiment, the expander is in the form of a circular, corrugated, flat metal strip which is corrugated in the axial direction. In this embodiment, the amplitude of the corrugation extends between the two ring groove flanks in the width dimensions of the ring groove when in the installed state. As a result, the expander can simply be in the form of a circumferential, wave-shaped expander. This embodiment can be in such a form that the height of the expander and thus of the piston ring is greater when the piston ring is compressed in the radial direction.

In another advantageous embodiment of the three-piece piston oil control ring, the expander is in the form of a circular, corrugated, flat metal strip which is corrugated in the radial direction. In this embodiment, the amplitude of the corrugation extends between the bottom of the ring groove and the cylinder inner surface when in the installed state. This embodiment has the advantage that the height of the piston ring does not change, regardless of the current diameter/radius of the piston ring.

In a further advantageous embodiment of the three-piece piston oil control ring, the expander spring is in the form of a slotted spiral spring. The slotted spiral spring can be in the form of a metal strip with a U-shaped cross-section into which slots are made alternately. The U-profile with the U-shaped cross-section has slots which extend from one side of the U-shaped profile to the other side. Overall, a zigzag spring is produced, the zigzag shape of which runs in the plane of a sheet metal layer, which is bent to form a U shape. In this case, the slots extend such that they intersect, so the resulting shape can act like a zigzag spring. In cross-section, the ends of the sides of the U shape can be angled outwards in order to form the projections or tabs which push the scraping and stabilising rings outwards.

In a further embodiment, the expander spring is also provided with a stabilising wire which runs through openings in wave flanks of the corrugated metal strip. This embodiment is intended mainly for the expander springs which are corrugated in the radial direction and those which are corrugated in the axial direction. The stabilising wire can prevent the expander spring bulging inwards and bearing against the piston ring groove. The stabilising wire can also ensure that the ends of the expander spring remain lying on each other.

In another exemplary embodiment, the projections are formed by tabs on the expander spring or metal strip. Such tabs can be pushed out of the material or bears against an edge of the material of the expander spring. The projections should each bear against the inner edges of the scraping ring and of the stabilising ring and push them outwards in the direction of the cylinder inner wall.

In a further embodiment of the three-piece piston oil control ring, projections are provided with which the expander spring or the circular, corrugated, flat metal strip and/or the stabilising ring are centred in the piston ring groove relative to the groove bottom. Since the stabilising ring is not supported relative to the cylinder inner wall, its position in the piston ring groove is not defined further. To align the stabilising ring centrally in the piston ring groove, inner projections can therefore be arranged on the stabilising ring and/or on the expander spring to achieve a defined position of the stabilising ring in the piston ring groove. This can be implemented with tabs or inner projections which support the stabilising ring and/or the expander spring relative to the groove bottom.

A further embodiment of the piston oil control ring has a stabilising ring which has a ring gap region which is provided with connecting elements which allow the ring gap of the stabilising ring to be closed by connecting the ring gap ends to each other. To avoid friction, the stabilising ring should not come into contact with the cylinder inner wall; this can be ensured most simply in that the ring gap ends are provided e.g. with dovetail structures which allow the ring gap ends to interlock. It can thus be ensured that the stabilising ring cannot come into contact with the cylinder inner wall. It is possible to mount the stabilising ring first, connect the ring gap ends, then insert the expander, and finally place the scraping ring into the piston ring groove.

According to a further embodiment of the present invention, the stabilising ring of the three-piece piston oil control ring is preloaded inwards so that the stabilising ring tends to bring the ring gap ends into contact. In contrast to the scraping ring, which is preloaded radially outwards, the stabilising ring is preloaded radially inwards in order to be able to absorb the radially outwardly effective forces of the expander or expander spring.

Further features and advantages of the present invention can be found in the description below in conjunction with the drawings, in which the same reference signs denote the same or similar parts. The drawings show multiple exemplary embodiments of the invention. In the figures, the present invention is illustrated using schematic diagrams which are not to scale and mainly intended to show the difference from conventional scraper rings.

THE DRAWINGS

FIG. 2B shows the three-piece scraper ring of FIG. 2A in a sectional view.

FIG. 2C shows a variant of the three-piece scraper ring of FIG. 2A in a sectional view.

FIG. 2D shows a further variant of the three-piece scraper ring of FIG. 2A in a sectional view.

DETAILED DESCRIPTION

The same or similar reference signs are used both in the figures and in the description below to refer to the same or similar elements or components.

Figure 1:
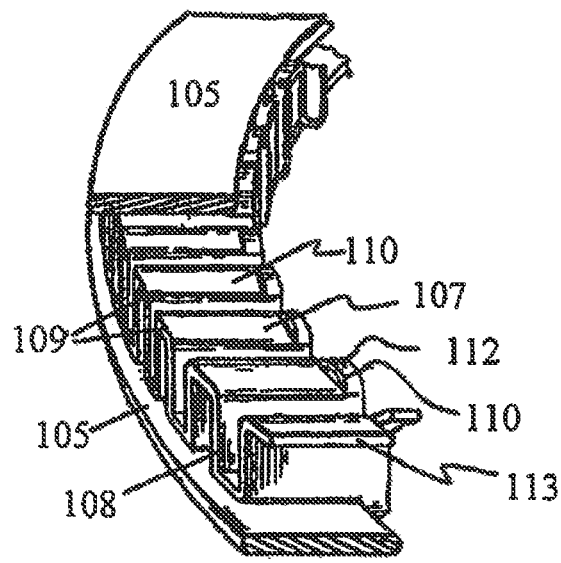
FIG. 1 shows a conventional three-piece scraper ring having an expander spring corrugated in the axial direction, in a perspective partial view.

FIG. 1 shows a conventional three-piece scraper ring having an expander spring corrugated in the axial direction, in a perspective partial view. The conventional three-piece scraper ring comprises two scraping elements 105 and an expander/spacer 109 which is produced from an elastic, ductile metal strip, preferably a steel strip 113. The expander/spacer ensures an axial spacing between the two scraping elements 105 and pushes them outwards against a cylinder inner wall to the same extent. The steel strip 109 is corrugated and comprises multiple uniformly spaced waves 108 in the axial direction. The bends 109 of the waves are provided with slots 112, the sections 111 of the waves being flattened to achieve support of the scraping rings 105 in the axial direction. The sections 101 of the bends which protrude beyond the flattened wave peaks form projections 101 which bear against inner faces of the scraping elements 105 and push them outwards towards the cylinder inner wall. The projections 101 also ensure that the expander/spacer 107 does not come into contact with the cylinder wall.

The wave shapes and straight sections 108 of the steel strip 113 form a circumferential series of spring elements which are under compressive load when the three-piece scraper ring is inserted into the piston ring groove. As shown, the ends or projections 113 of the expander/spacer 107 bear against the lower face of the scraping elements 107 and push them against the piston ring flank. The flattened portions 107 can be very uniformly shaped, and the magnitude of the radial force provided by the expander 109 can be set very precisely in this design.

Figure 2A:
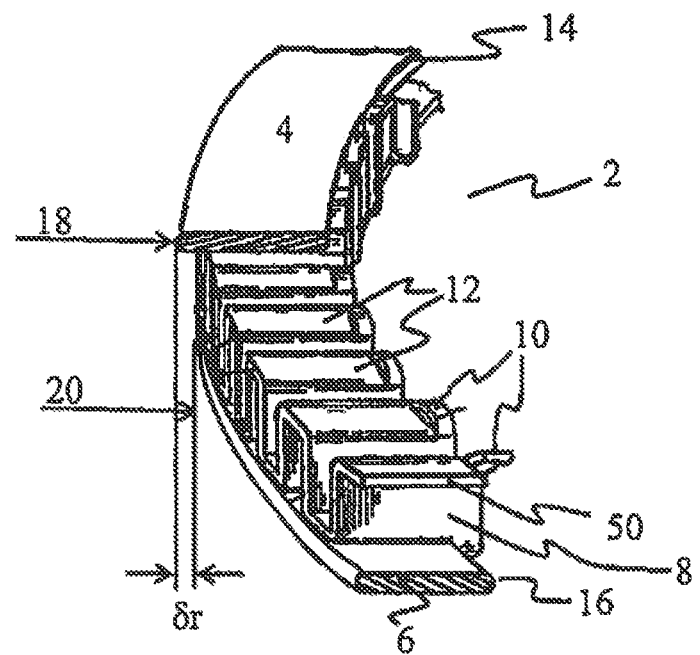
FIG. 2A shows a three-piece scraper ring according to the invention having an expander spring corrugated in the axial direction, in a perspective partial view.

FIG. 2A shows a three-piece scraper ring 2 according to the invention having an expander spring 8 corrugated in the axial direction, in a perspective partial view. The diagram corresponds substantially to FIG. 1, there being instead of the lower scraping element a stabilising ring 6, the outer diameter/radius of which is smaller than that of the upper, disc-shaped scraping ring 4. The expander/spacer 8 is in the form of a metal strip which is corrugated in the axial direction and comprises bearing faces 12 for the scraping ring 4 and for the stabilising ring 6. The flat metal strip corrugated in the axial direction has projections 10 which protrude in the axial direction and each bear against the inside of both the scraping ring 4 and the stabilising ring 6 and push them outwards. Owing to different outer diameters/radii of the scraping ring 4 and of the stabilising ring 6, the scraping ring 4 protrudes further outwards than the stabilising ring 6 by the diameter/radius difference between the stabilising ring and the scraping ring. Therefore, only the scraping ring 4 comes into contact with a cylinder inner wall or at least only the scraping ring is pressed against the cylinder inner wall with any considerable force. In this embodiment, only the scraping ring scrapes oil from a cylinder inner wall, while the stabilising ring either has no contact at all with the cylinder inner surface or is pressed by the expander against the cylinder inner surface only so slightly that it cannot make a substantial contribution to scraping the oil.

FIG. 2B shows the three-piece scraper ring 2 of FIG. 2A in a sectional view. Nearly all the reference signs are shown in FIG. 2B. The reference signs are not used for the subsequent figures to avoid unnecessarily affecting the clarity of the figures and the brevity and conciseness of the description by unnecessary, redundant, multiple repetitions of the same reference signs.

The embodiment of the three-piece piston oil control ring 2 according to the invention comprises an upper, disc-shaped scraping ring 4, a lower, disc-shaped stabilising ring 6, and a circular expander/spacer 8 which is arranged between the scraping ring 4 and the stabilising ring 6. The expander 8 is in the form of a flat metal strip 30 corrugated in the axial direction.

The expander has projections 10 which extend in the axial direction from bearing faces 12 of the expander and each bear against the inner face 14 of the scraping ring or the inner face 16 of the stabilising ring 6 and push them radially outwards.

The scraping ring 4 is outwardly preloaded and is additionally pushed outwards against the cylinder inner wall 40 by the expander. The stabilising ring 6 is inwardly preloaded and stabilises the expander 8 and prevents the latter from tilting and jamming in the piston ring groove 44.

The three-piece piston oil control ring 2 is inserted into a piston ring groove 44 in a piston 42 and bears against the upper and lower piston ring groove flanks 46. The three-piece piston oil control ring 2 is not in contact with the bottom 48 of the piston ring groove. Only an outer edge of the upper scraping ring 4 of the three-piece piston oil control ring 2 is in contact with a cylinder inner surface 40.

The expander 8 is in the form of a flat metal strip 30 corrugated in the axial direction, and the regions 50 each represent cross-sectional areas of the metal strip 30 or expander, while the other view is a plan view of a flank of a wave of the corrugated metal strip.

The scraping ring 4 has an axial thickness 26 which is exactly the same as the axial thickness 26 of the stabilising ring 6. The scraping ring 4 has a radial thickness 22 which is greater than a radial thickness 24 of the stabilising ring 6.

This structure allows a substantially symmetrical expander 8 to be used, the bearing faces of which are of equal size for the scraping ring 4 and the stabilising ring 6.

The arrows 18 and 20 represent the outer radius or outer diameter of the scraping ring 4 and of the stabilising ring 6, respectively. The scraping ring 4 has a radius which is greater by δr than that of the stabilising ring 6. The radius difference δr between the stabilising ring and the scraping ring ensures that only the scraping ring 4 scrapes oil from the cylinder inner wall 40 and only the scraping ring 4 contributes to the friction of the three-piece piston oil control ring 2. The frictional resistance of the three-piece piston oil control ring 2 according to the invention should thus be reduced in comparison with a conventional three-piece piston oil control ring as shown by way of example in FIG. 1. The reduction in the frictional resistance is achieved in that according to the invention only a scraping edge scrapes oil and only a scraping edge produces friction with the cylinder inner surface.

FIG. 2C shows a variant of the three-piece scraper ring of FIG. 2A in a sectional view. In contrast to the embodiment of FIG. 2A, the scraping ring 4 and the stabilising ring have an identical radial thickness 22. With bent scraping and stabilising rings 4, 6, this design means that the same material can be assumed. The expander 8 is in the form of a metal strip 30 which is corrugated in the axial direction. The metal strip is likewise corrugated in the radial direction to provide each of the scraping and stabilising rings 4, 6 with a different diameter against which the projections 10 support the rings 4, 6 on the inside. In FIG. 2C too, the cross-section of the metal strip 30 of the expander 8 is indicated by reference sign 50.

FIG. 2C shows a further variant of the three-piece scraper ring of FIG. 2A in a sectional view. In contrast to the embodiment of FIG. 2A, the scraping ring 4 and the stabilising ring have an identical radial thickness 22. With bent scraping and stabilising rings 4, 6, this design means that the same material can be assumed. The expander 8 is in the form of a metal strip 30, so that the projections 10 each have a different distance in the radial direction from a centre axis of the cylinder. The metal strip can be produced more simply in this case. In FIG. 2D, the cross-section of the metal strip 30 of the expander 8 is indicated by reference sign 50.

Figure 3A:
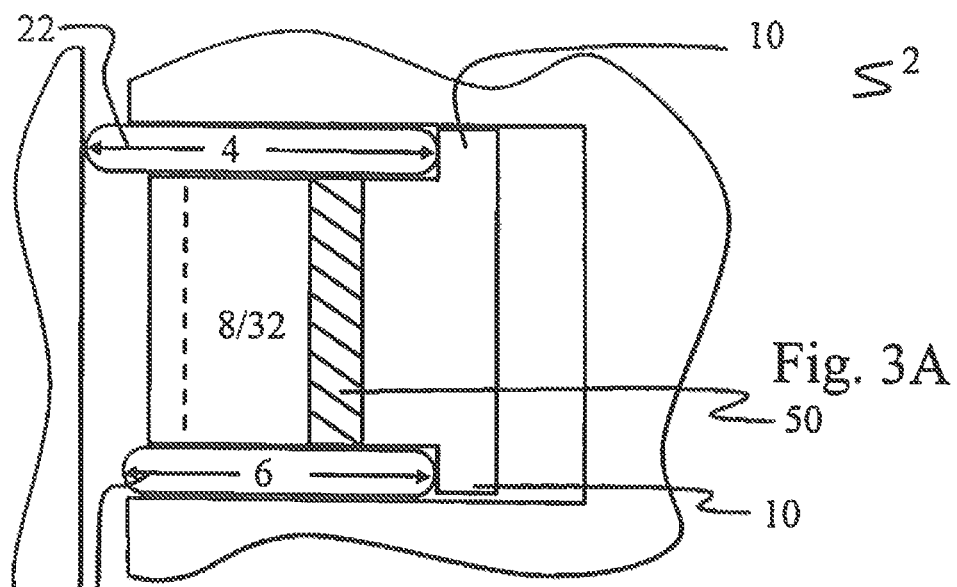
FIG. 3A shows a three-piece scraper ring according to the invention having an expander spring corrugated in the radial direction, in a sectional view.
Figure 3B:
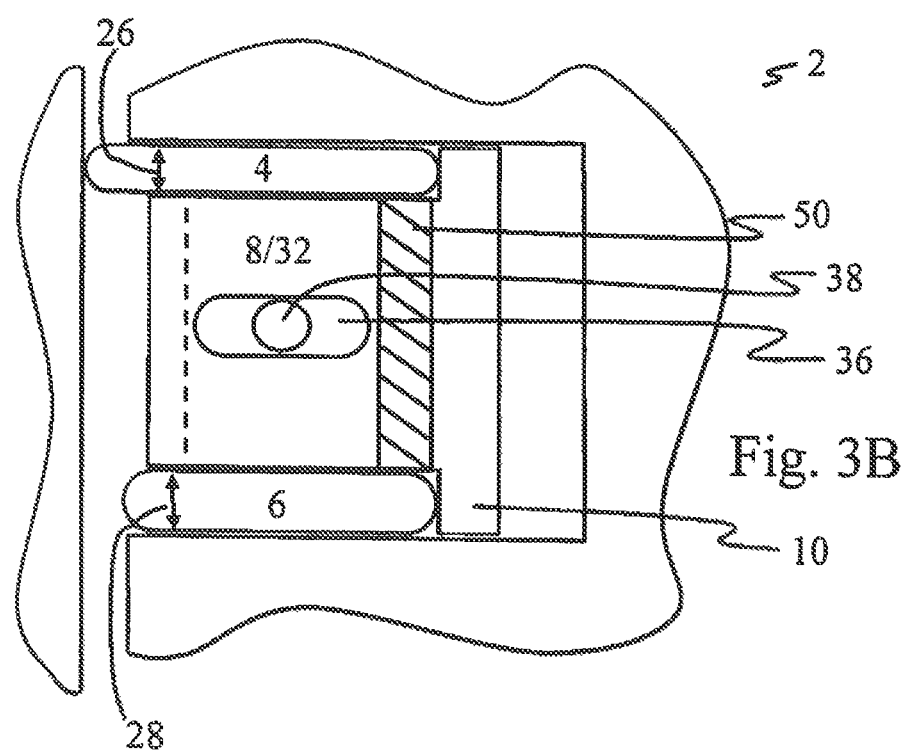
FIG. 3B shows a variant of the three-piece scraper ring of FIG. 3A in a sectional view.

FIG. 3A shows a cross-sectional view of another variant of a three-piece scraper ring 2 according to the invention. The scraping ring 4 and the stabilising ring 6 have a different width in the radial direction, as in FIG. 2B. The radial width 22 of the scraping ring 4 is greater than the radial width 24 of the stabilising ring 6. The scraping ring 4 and the stabilising ring 6 have an identical width in the axial direction in FIG. 3A. An expander 8 in the form of a corrugated metal strip 32 is also used in FIG. 3A. In contrast to the expander 8 of FIGS. 2A to 2D, the expander 8 of FIGS. 3A and 3B is in the form of a metal strip 32 corrugated in the radial direction. In this case, the projections 10 can simply be in the form of tabs which protrude laterally (or upwards and downwards) beyond the bearing faces of the expander 8.

FIG. 3B shows a cross-sectional view of an additional variant of a three-piece scraper ring 2 according to the invention. The scraping ring 4 and the stabilising ring 6 have a different width in the radial direction, as in FIG. 3A. The radial width 22 of the scraping ring 4 is greater than the radial width 24 of the stabilising ring 6.

The scraping ring 4 and the stabilising ring 6 have a different width in the axial direction, in contrast to FIG. 3A. The axial width 26 of the scraping ring 4 is smaller than the axial width 28 of the stabilising ring 6. In this design, the stabilising ring 6 can be made more stable than the scraping ring 4. An object of the invention consists in preventing the expander 8 from being able to twist and thus jam in the piston ring groove. To achieve this, the forces which are exerted on each of the axial projections of the expander should be as equal as possible, since the stabilising ring will have a smaller radial dimension than the scraping ring, and the scraping ring is additionally supported by the cylinder inner wall against which it bears. Therefore, the stabilising ring must be able to produce a greater force than the scraping ring 4. The stabilising ring 6 can achieve this by being inwardly preloaded and more rigid than the scraping ring.

In FIG. 3B, the expander 8 or the metal strip corrugated in the radial direction is provided with openings 36 in the circumferential direction, in which a circumferential stabilising wire 38 is arranged. The stabilising wire should prevent the expander curving and being supported against the groove bottom.

Figure 4:
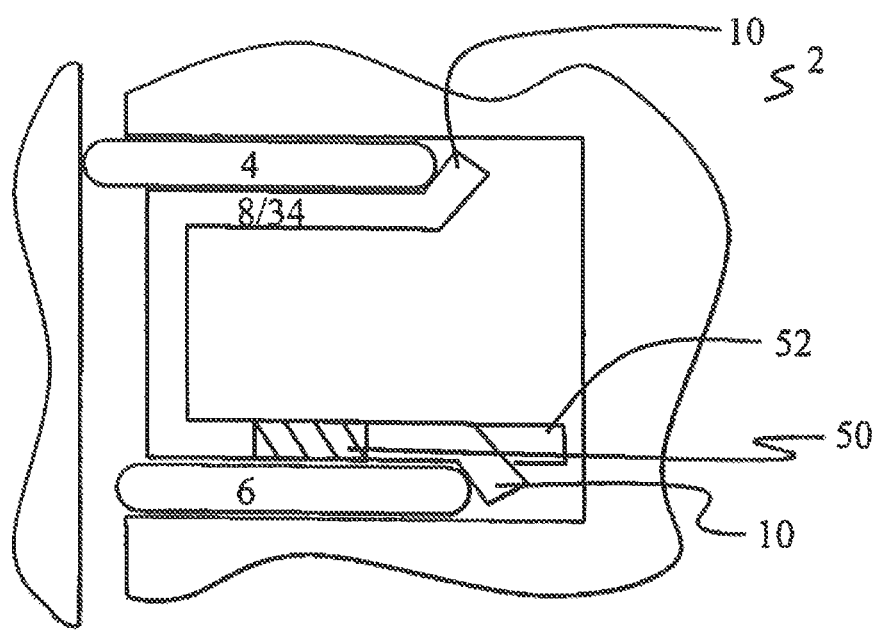
FIG. 4 shows a three-piece scraper ring according to the invention having an expander spring in the form of a slotted spiral spring.

In FIG. 4, the expander 8 is in the form of a slotted spiral spring 34. The slotted spiral spring 34 has a U-shaped cross-section. The ends of the sides of the U-shaped cross-section are bent outwards to bear against the inner edges of the scraping ring 4 and of the stabilising ring. In FIG. 4, the cross-section of the slotted spiral spring 34/of the expander 8 is indicated by reference sign 50. Centring projections 52 are provided on the inside of the lower edge of the expander 8. Neither the expander 8 nor the stabilising ring 8 is stabilised by contact with a cylinder inner surface, since such contact would mean an increase in the friction. By contact with the groove bottom, the centring projections 52 on the expander 8 can prevent the stabilising ring or the expander coming into contact with the cylinder inner surface and thus producing friction. It is likewise possible to attach the centring projections 52 to the stabilising ring 6.

Further combinations of individual features of the exemplary embodiments should also be regarded as disclosed. In particular, all the embodiments can be provided with the centring projections, the rings can have different thicknesses in the radial and axial directions, and the projections in the axial direction can likewise be different (in the leakproof and radial position of the expander).

In a further embodiment, a three-piece piston oil control ring 2 is provided, comprising a lower, disc-shaped scraping ring 4, an upper, disc-shaped stabilizing ring 6 (towards the combustion chamber), and a circular expander 8 which has projections 10 protruding in the axial direction on an inner face, and wherein the circular expander 8 is arranged between the lower scraping ring 4 and the upper stabilising ring 6, wherein the projections 10 each bear inwardly against an inner face 14 of the scraping ring 4 or against an inner face 16 of the stabilising ring 6, wherein an outer radius of the lower scraping ring 4 is greater than an outer radius of the upper stabilising ring 6.

The invention claimed is:

1. A three-piece piston oil control ring, comprising an upper, disc-shaped scraping ring, a lower, disc-shaped stabilizing ring formed as a separate piece from the scraping ring, and a circular expander which has projections protruding in an axial direction on an inner face thereof, the circular expander being arranged in the axial direction between the upper scraping ring and the lower stabilizing ring, some of the projections bearing inwardly against a radial inner face of the scraping ring and some of the projections bearing against a radial inner face of the stabilizing ring, wherein an outermost radius of the scraping ring is greater than an outermost radius of the lower stabilizing ring.

2. The three-piece piston oil control ring according to claim 1, wherein only a scraping edge of the upper scraping ring is in contact with a cylinder inner surface when the piston oil control ring is installed, and the lower, disc-shaped stabilizing ring is not in contact with the cylinder inner surface when the piston oil control ring is installed.

3. The three-piece piston oil control ring according to claim 1, wherein the upper scraping ring and the lower, disc-shaped stabilizing ring have an identical thickness in a radial direction.

4. The three-piece piston oil control ring according to claim 1 wherein a thickness of the upper scraping ring is larger in the radial direction than a thickness of the lower, disc-shaped stabilizing ring.

5. The three-piece piston oil control ring according to claim 1, wherein an axial thickness of the upper scraping ring is exactly equal to an axial thickness of the lower, disc-shaped stabilizing ring.

6. The three-piece piston oil control ring according to claim 1, wherein an axial thickness of the upper scraping ring is smaller than an axial thickness of the lower stabilizing ring.

7. The three-piece piston oil control ring according to claim 1, wherein the circular expander is in the form of a corrugated, flat metal strip which is corrugated in the axial direction.

8. The three-piece piston oil control ring according to claim 1, wherein the circular expander is in the form of a flat metal strip which is corrugated in a radial direction.

9. The three-piece piston oil control ring according to claim 1, wherein the expander is in the form of a slotted spiral spring.

10. The three-piece piston oil control ring according to claim 7, wherein the expander is additionally provided with a stabilizing wire which runs through openings in wave flanks of the corrugated metal strip.

11. The three-piece piston oil control ring according to claim 7, wherein the projections are formed by tabs on the metal strip.

12. The three-piece piston oil control ring according to claim 1, wherein centering projections are provided for supporting the expander centered in a piston ring groove relative to a groove bottom.

13. The three-piece piston oil control ring according to claim 1, wherein the stabilizing ring is inwardly preloaded.

* * * * *